United States Patent [19]
Stevens et al.

[11] Patent Number: 6,061,916
[45] Date of Patent: May 16, 2000

[54] HEAD TRACKING SYSTEM

[75] Inventors: Andrew John Stevens, Johnstone; Robert Stevens, Nottingham; Wayne Mark Cranton, Tollerton, all of United Kingdom

[73] Assignee: Barr & Stroud Limited, Glasgow, United Kingdom

[21] Appl. No.: 09/079,786

[22] Filed: May 15, 1998

[51] Int. Cl.$^7$ .............................. G01B 15/00; G01C 3/10
[52] U.S. Cl. .................... 33/1 MP; 33/1 CC; 33/262; 33/512; 250/338.1
[58] Field of Search ........................... 33/613, 262, 1 R, 33/1 CC, 1 MP, 511, 512; 250/338.1, 358.1, 359.1, 360.1, 215, 491.1

[56] References Cited

U.S. PATENT DOCUMENTS

| | | | |
|---|---|---|---|
| 4,486,955 | 12/1984 | Fisher et al. | 33/262 |
| 4,688,037 | 8/1987 | Krieg | 250/491.1 |
| 4,691,446 | 9/1987 | Pitches et al. | 33/1 CC |
| 5,452,516 | 9/1995 | Schegerin | 33/1 MP |

FOREIGN PATENT DOCUMENTS

| | | |
|---|---|---|
| 2 522 804 | 9/1983 | France . |
| 38 04 293 | 8/1989 | Germany . |
| 2 120 381 | 11/1983 | United Kingdom . |
| 97 50132 | 12/1997 | WIPO . |

OTHER PUBLICATIONS

Japanese Abstract 02 187704, published Jul. 23, 1990, for "Plastic Fluorescent Fiber".
Japanese Abstract 05 152609, published Jun. 18, 1993, for "Light Emitting Diode".

*Primary Examiner*—Christopher W. Fulton
*Attorney, Agent, or Firm*—Alston & Bird LLP

[57] ABSTRACT

A head tracking system 10 comprises a radiation emitter 18 and a radiation sensor 16 connected to a tracking processor 12. The emitter 18 has an output 46 producing radiation with spectral peak in the range 1000 nm to 1100 nm from a conventional LED 40 with a spectral peak in the range 500 nm to 900 nm in combination with a photoluminescent material 42.

8 Claims, 1 Drawing Sheet

HEAD TRACKING SYSTEM

The present invention relates to a Head Tracking System (HTS) which can be used in combination with Night Vision Goggles (NVGs). In particular, the invention relates to an HTS incorporated in a Helmet Mounted Display (HMD) and which uses pulsed LED-based devices to ensure compatability with NVGs.

HTSs are used by pilots of aircraft such as fast military aeroplanes and attack helicopters. HTSs are used as part of HMDs to ensure that the HMD displays to the pilot the appropriate view for the current position and orientation of the pilot's head.

Some conventional HTSs use pulsed LEDs mounted on the pilot's helmet and silicon Charge Coupled Device (CCD) cameras mounted in the aircraft cockpit to determine the position of the pilot's helmet (and therefore the pilot's head).

As the light from LEDs is reflected from the airframe canopy or windscreen, visible LEDs are highly visible to the pilot and/or copilot, and therefore highly distracting. Flashing light from the LEDs is also transmitted through the canopy and may affect the covertness of the aircraft if visible light is used. For these reasons, the LEDs should not emit in the visible region (approximately 400 nm to 700 nm).

HTSs are sometimes used in combination with NVGs or helmet mounted cameras with image intensifiers. However, NVGs are sensitive to radiation with a wavelength up to approximately 1000 nm so LEDs that emit radiation between approximately 700 nm and 1000 nm cannot be safely used because of the risk of the LEDs interfering with the NVGs.

Silicon CCD cameras are only sensitive to radiation with a wavelength between approximately 400 nm and 1100 nm. Therefore, a suitable LED for use with the HTS/NVG combination must have a peak emission between approximately 1000 nm and 1100 nm and substantially no emission below 1000 nm. LEDs are available which emit at wavelengths in this range but these are expensive and do not have high output powers.

It is an object of one embodiment of this invention to provide an improved HTS which is compatible with NVGs. It is an object of one embodiment of this invention to provide a small, efficient, fast-switching light source which operates in a narrow bandwidth between 1000 nm and 1100 nm for use with an HTS/NVGs combination.

According to a first aspect of the present invention there is provided a head tracking system for use in combination with night vision goggles, and comprising:
- a tracking processor,
- a radiation sensor,
- a radiation emitter, the radiation emitter producing at its output infra-red radiation with a spectral peak at a wavelength greater than approximately 1000 nm, and the radiation emitter comprising:
  - an LED emitting with a spectral peak at a first wavelength which is less than approximately 1000 nm,
  - a photoluminescent material disposed between the LED and the output of the radiation emitter, the photoluminexcent material absorbing radiation at approximately the first wavelength and emitting radiation at a second wavelength which is greater than approximately 1000 nm and which is detectable by the radiation sensor,
  - whereby only radiation greater than approximately 1000 nm is output from the radiation emitter.

The photoluminescent material may be in the form of a coating applied to the LED. Conveniently, the coating may be applied by dip coating or screen printing techniques. Alternatively, the material may be in the form of a layer which is spatially separated from the LED.

In one embodiment of the invention a filter is disposed between the photoluminescent material and the output, where the filter absorbs radiation which has a wavelength lower than approximately 1000 nm to ensure that no radiation having a wavelength lower than approximately 1000 nm is output from the radiation emitter.

In one embodiment of the invention the second wavelength is less than approximately 1100 nm.

According to a second aspect of the present invention there is provided a radiation emitting device for use with a Head Tracker System, where the radiation emitting device comprises:
- an LED emitting with a spectral peak at a first wavelength which is less than approximately 1000 nm,
- a photoluminescent material disposed between the LED and an output of the radiation emitter device, the photoluminescent material absorbing radiation at approximately the first wavelength and emitting radiation at a second wavelength which is greater than approximately 1000 nm,
- whereby only radiation greater than approximately 1000 nm is output from the device.

In one embodiment of the invention the second wavelength is less than approximately 1100 nm.

According to a third aspect of the present invention there is provided a method of generating at a device output infra-red radiation at a wavelength greater than approximately 1000 nm, such that the device is suitable for use in a Head Tracking System in combination with Night Vision Goggles, and comprising the steps of:
- providing an LED having an emission spectral peak at a first wavelength less than approximately 1000 nm,
- disposing a photoluminescent material between the LED and the device output, where the material absorbs radiation at approximately the first wavelength and emits radiation at a second wavelength greater than approximately 1000 nm,
- whereby only radiation greater than approximately 1000 nm is output from the device.

The step of disposing a photoluminescent material between the LED and the device output may include the step of coating the LED with a photoluminescent material.

The step of disposing a photoluminescent material between the LED and the device output may include the step of disposing photoluminescent material which emits radiation in the wavelength range from 1000 nm to 1100 nm.

The method may comprise the further step of disposing a filter between the material and the output, the filter absorbing radiation having a wavelength lower than approximately 1000 nm to ensure that no radiation with a wavelength lower than approximately 1000 nm is emitted by the radiation emitter.

According to a fourth aspect of the present invention there is provided a head tracking system according to the first aspect of the invention incorporated in a helmet mounted display device.

It will be understood that, in practice, filters cannot absorb all radiation greater than a predetermined wavelength and pass without attenuation all radiation less than the predetermined wavelength. It will also be appreciated that sources such as LEDs emit radiation over a wavelength range rather than at a single wavelength. Therefore, this description should be interpreted accordingly. Where an emission wavelength is given what is generally intended is the spectral peak of the radiation. Where a cut-off value for a filter is given, what is generally intended is the steepest portion of the transmission characteristic (transmission versus wavelength) for the filter.

Embodiments of the present invention will now be described, by way of example, with reference to the accompanying drawings in which.

Figure 1:
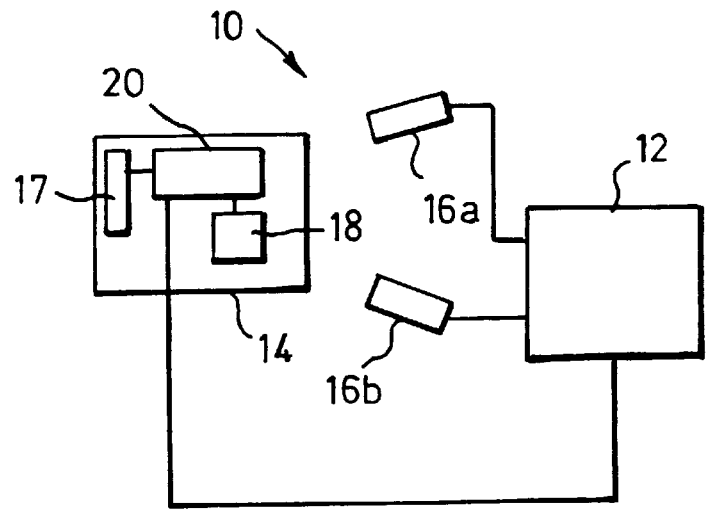
FIG. 1 is a block diagram of an improved tracker system incorporated in an HMD according to one embodiment of the present invention.

Referring to FIG. 1, there is a head tracking system (HTS) in combination with an HMD, generally indicated by reference numeral 10, of the type commonly used in aircraft cockpits and which is suitable for use with NVGs. Conventionally, there are two HTSs 10 in an aircraft, one for the pilot and the other for the co-pilot. For clarity, the following description relates to use by a pilot, although an identical system could be used by a co-pilot.

The HTS 10 comprises a tracking processor 12 which is fixed within the aircraft, a helmet 14 which is worn by the pilot, and two radiation sensors 16a,b which are fixed in the cockpit of the aircraft and directed to the pilot's helmet 14.

The helmet 14 comprises a helmet mounted display (HMD) 17, a plurality of radiation emitters 18 disposed on the outside of the helmet 14, and a control unit 20 which controls the radiation emitters 18 and which is also connected to HMD 17.

Each radiation emitter 18 (for clarity, only one radiation emitter 18 is shown) comprises a plurality of LEDs, as will be described in more detail below. Only one sensor 16a and one emitter 18 is required but the other sensor 16b and emitters 18 are used to provide a cross check of the helmet 14 position and orientation, and to ensure that if one sensor "loses" the helmet 14 the other sensor will still provide the necessary helmet position and orientation information.

The sensors 16a,b are used to detect the radiation emitters 18. Each sensor 16a,b is a silicon CCD camera which is connected to a tracking processor 12. The tracking processor 12 receives video images from the sensors 16a,b and processes these images to provide information on both the angular and linear helmet position. The tracking processor 12 is also connected to the control unit 20 to enable the processor 12 to control the emitters 18 and the HMD 17 to send calibration data to the tracking processor 12.

In use, as a pilot who is wearing the helmet 14 moves his or her head, the position of the radiation emitters 18 change. The radiation sensors 16a, 16b independently detect the position in space of the radiation emitters 18 and using this information the tracking processor 12 outputs the correct position of the helmet 14 as a result of which the displayed information on the HMD can be corrected from its nominally correct display to its actually correct display. Actions consequently initiated by the pilot using the display are therefore corrected for head movement.

Figure 2:
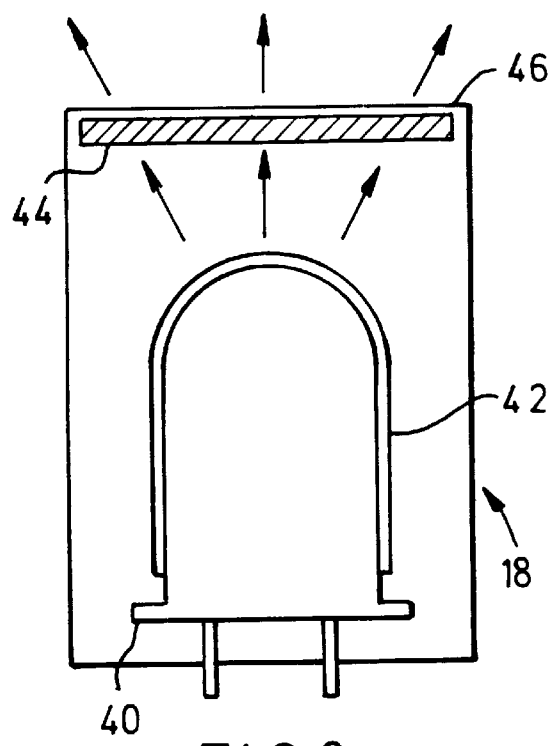
FIG. 2 is a radiation emitter used in one embodiment of the present invention.

FIG. 2 shows a radiation emitter 18 used in one embodiment of the present invention. The radiation emitter 18 comprises an LED 40 having a photoluminescent coating 42, and a filter 44. The LED 40 is an H3000-L (available from Stanley Electric Company, 2-9-13 Nakmeguro, Meguro -2KU, Tokyo, Japan).

The photoluminescent coating 42 is made of a UMPKC60 phosphor available from Phosphor Technology Limited. The coating 42 is applied by dipping the LED 40 into the phosphor in liquid form. The phosphor coating 42 absorbs radiation from the LED 40 (which has a spectral peak at approximately 670 nm) and emits radiation with spectral peaks at wavelengths of approximately 670 nm, 880 nm, 940 nm, and 1060 nm. The intensity of these spectral peaks depends on factors such as the optical power from the LED 40, the density of the phosphor coating 42, the quantum efficiency of the phosphor material, and the phosphor grain size.

The filter 44 is a Nd:YAG laser filter which has a transmission of less than 5% for wavelengths lower than 1000 nm and a transmission of more than 50% for wavelengths greater than 1040 nm. Thus, only that part of the emission with a spectral peak at 1060 nm appears at the output 46 of the radiation emitter 18.

Figure 3:
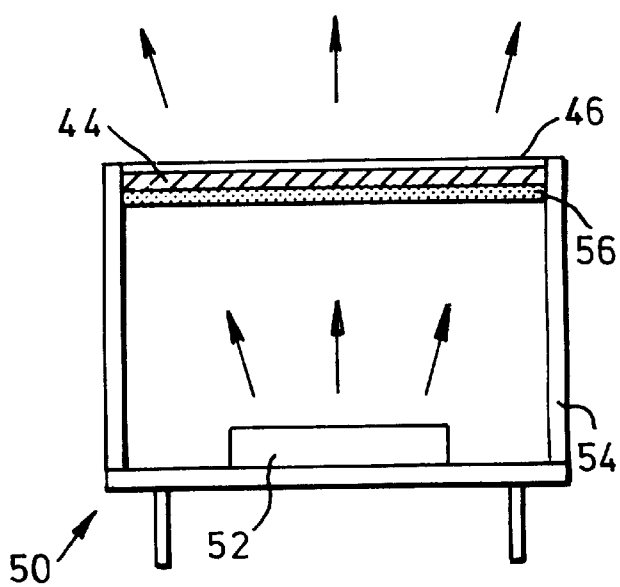
FIG. 3 is a radiation emitter used in another embodiment of the present invention.

FIG. 3 shows a modified radiation emitter 50 which is used in another embodiment of this invention. The modified emitter 50 uses an LED 52 (H3000-L) in integrated circuit form which is mounted in a package 54. In accordance with the present invention a photoluminescent layer 56 (a UMPKC60 phosphor) is disposed between the LED 52 and the output 46 of the emitter 50. Additionally a Nd:YAG laser filter 44 is disposed between the layer 56 and the output 46. The operation of the modified emitter 50 and the emission produced is identical to the operation and emission of the emitter 18.

It will be apparent that one advantage of this invention is that the radiation emitter 18 provides output radiation which is in the range of 1000 nm to 1100 nm. Therefore, the emitter 18 is compatible with an HTS which uses both NVGs (which are not sensitive to radiation above 1000 nm) and also silicon CCD cameras 16 (which are not sensitive to radiation above 1100 nm).

Various modifications may be made to the above described embodiments within the scope of the present invention. For example, there are many types of LEDs that may be used to provide a radiation source, such as a TLRE180P and a DN305. Similarly, other types of photoluminescent material may be used, such as PTIR1010. The important consideration in choosing an appropriate combination of LED and photoluminescent material is that the radiation emitted by the LED should be highly absorbed by the photoluminescent material, and the photoluminescent material should emit high intensity radiation in the wavelength range from approximately 1000 nm to 1100 nm. In other embodiments the filter may not be a Nd:YAG filter, it may be any material which is highly absorptive to radiation below 1000 nm and weakly absorptive to radiation above 1000 nm. The filter may be made from multiple layers of thin films deposited onto a substrate or it may be fabricated by holographic techniques. The phosphor coating may be applied by other techniques, for example screen printing.

What is claimed is:

1. A head tracking system for use in combination with night vision goggles, and comprising:
   a tracking processor (12),
   a radiation sensor (16),
   a radiation emitter (18), the radiation emitter producing at its output (46) infra-red radiation with a spectral peak at a wavelength greater than approximately 1000 nm, and the radiation emitter (18) comprising:
   an LED (40) emitting with a spectral peak at a first wavelength which is less than approximately 1000 nm,
   a photoluminescent material (42) disposed between the LED (40) and the output (46) of the radiation emitter (18), the photoluminescent material absorbing radiation at approximately the first wavelength and emitting radiation at a second wavelength which is greater than approximately 1000 nm and which is detectable by the radiation sensor (16), whereby only radiation greater than approximately 1000 nm is output from the radiation emitter (18).

2. A head tracking system as claimed in claim 1, wherein the photoluminescent material (42) is in the form of a coating applied to the LED (40).

3. A head tracking system as claimed in claim 1, wherein the photoluminescent material is in the form of a layer (56) spatially separated from the LED (40, 52).

4. A head tracking system as claimed in claim 3, including a filter (44) disposed between the photoluminescent material (42, 56) and the output (46) of the emitter (18).

5. A head tracking system as claimed in claim 1, wherein the second wavelength is less than approximately 1100 nm.

6. A head tracking system as claimed in claim 1, wherein the radiation emitter (18) is mounted on the exterior of a helmet (14) which incorporates a helmet mounted display (17) connected to the tracking processor (12).

7. A radiation emitting device for use with a Head Tracker System, where the radiation emitting device (18) comprises:

an LED (40) emitting with a spectral peak at a first wavelength which is less than approximately 1000 nm, a photoluminescent material (42) disposed between the LED (40) and an output (46) of the radiation emitter device (18), the photoluminescent material absorbing radiation at approximately the first wavelength and emitting radiation at a second wavelength which is greater than approximately 1000 nm, whereby only radiation greater than approximately 1000 nm is output from the device (18).

8. A radiation emitting device as claimed in claim 7, wherein the second wavelength is less than approximately 1100 nm.

* * * * *

UNITED STATES PATENT AND TRADEMARK OFFICE
CERTIFICATE OF CORRECTION

PATENT NO.   : 6,061,916
DATED        : May 16, 2000
INVENTOR(S)  : Stevens et al.

It is certified that error appears in the above-identified patent and that said Letters Patent is hereby corrected as shown below:

Title page,
Insert the following:

-- Foreign Application Priority Data
June 3, 1997    United Kingdom    9711330.2 --.

Signed and Sealed this

Fourteenth Day of May, 2002

Attest:

Attesting Officer

JAMES E. ROGAN
Director of the United States Patent and Trademark Office